US010648396B1

(12) United States Patent
Cook et al.

(10) Patent No.: US 10,648,396 B1
(45) Date of Patent: May 12, 2020

(54) GENERAL PURPOSE ENGINE

(71) Applicant: KAWASAKI JUKOGYO KABUSHIKI KAISHA, Kobe-shi, Hyogo (JP)

(72) Inventors: Jakob Daniel Cook, Ada, MI (US); Alexander Uldis Sics, Grand Rapids, MI (US)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 0 days.

(21) Appl. No.: 16/199,709

(22) Filed: Nov. 26, 2018

(51) Int. Cl.
F01P 11/06 (2006.01)
A01D 34/00 (2006.01)
F01P 5/02 (2006.01)
F01P 1/02 (2006.01)

(52) U.S. Cl.
CPC ............ F01P 11/06 (2013.01); A01D 34/003 (2013.01); F01P 1/02 (2013.01); F01P 5/02 (2013.01); F01P 2001/023 (2013.01); F01P 2011/063 (2013.01)

(58) Field of Classification Search
CPC ...... F01P 11/06; F01P 1/02; F01P 5/02; F01P 2001/023; F01P 2011/063; A01D 34/003
See application file for complete search history.

(56) References Cited

U.S. PATENT DOCUMENTS

| 3,132,386 A * | 5/1964 | Swaneck, Jr. ......... F25D 23/087 49/402 |
| 5,373,688 A * | 12/1994 | Stanley ................ A01D 51/002 56/328.1 |
| 2009/0250467 A1 * | 10/2009 | Schmidt ................ B60N 3/103 220/361 |
| 2017/0159600 A1 * | 6/2017 | Cook ...................... F02F 1/065 |

* cited by examiner

Primary Examiner — Jacob M Amick
Assistant Examiner — Charles Brauch

(57) ABSTRACT

A general purpose engine includes: a crankcase to support an engine rotary shaft; a cylinder unit extending from the crankcase in a direction perpendicular to an axis of the engine rotary shaft; a cooling fan fixed to one of opposite ends of the engine rotary shaft; and a fan housing configured to have an air induction opening defined therein for the cooling fan and to cover the crankcase and the cylinder unit from one side of the engine rotary shaft. At a position of the fan housing which is opposed to the cooling fin of the cylinder unit, a cleaning access window is defined. The cleaning access window is covered by a debris covering that is capable of being selectively opened and closed. The debris covering has one end portion engaged with the fan housing and the other end portion removably mounted on the fan housing by a magnetic body.

12 Claims, 9 Drawing Sheets

GENERAL PURPOSE ENGINE

BACKGROUND OF THE INVENTION

Field of the Invention

The present invention relates to a general purpose engine having a cleaning access window defined therein for a removal of foreign matters such as, for example, turf grasses and/or dust which are tangled in cylinders and/or cylinder heads.

Description of Related Art

In an air cooled engine of a kind used in, for example, a lawn mower, it is frequently experienced with such a trouble that foreign matters such as, for example, turf grasses and/or dust is tangled in cooling fins around cylinders and/or cylinder heads. Under such a condition, the cooling performance of the engine may be likely to be lowered. Accordingly, the user is frequently needed to remove such a dust at intervals of a predetermined length of time.

To remove the dust, the user need to detach a fan housing that covers the fins or to open a cleaning access window defined at the fan housing. In either case, a tool for the removal of the fan housing or of a lid for the cleaning access window is needed and, hence, the convenience is lowered.

SUMMARY OF THE INVENTION

In view of the foregoing, the present invention has for its primary object to provide a general purpose engine in which the convenience can be improved.

In order to accomplish the foregoing object, the present invention herein disclosed provides a general purpose engine which comprises: a crankcase configured to support an engine rotary shaft rotatably; a cylinder unit extending from the crankcase in a direction perpendicular to an axis of the engine rotary shaft; a cooling fan fixed to one of opposite ends of the engine rotary shaft on one side thereof; and a fan housing configured to have an air induction opening defined therein for the cooling fan and also to cover the crankcase and the cylinder unit from one side of the engine rotary shaft, in which case: a cleaning access window is defined at a position of the fan housing, which position is opposed to the cooling fin of the cylinder unit; the cleaning access window is covered by a debris covering capable of being selectively opened and closed; and the debris covering has one end portion engaged with the fan housing and also has the other end portion removably mounted on the fan housing by means of a magnetic body. The magnetic body referred to above may be provided in the debris covering or in the fan housing.

According to the above described construction, since the debris covering is removably mounted on the fan housing by means of the magnetic body, the debris covering can be opened with no tool needed. Accordingly, the access to the cleaning access window is made easy and the convenience of maintenance increases. Also, one end portion of the debris covering is engaged with the fan housing and the other end portion is mounted on the fan housing by means of the magnetic body. Accordingly, the use of only one magnetic body is sufficient and, also, the cleaning access window can be exposed by manipulating the debris covering with one hand. Therefore, the convenience of maintenance further increases.

In the present invention, the debris covering may comprise: a covering portion opposed to the cleaning access window; a to-be-engaged portion engaged to the fan housing; and a retainer portion configured to retain the magnetic body. In such case, the fan housing is a ferromagnetic body and the debris covering is made of, for example, a resin material. According to this construction, the magnetic body can be provided integrally with the debris covering. Therefore, the structure can be simplified.

Where the retainer portion is provided in the debris covering, the retainer portion may comprise a holding wall configured to hold the magnetic body in a condition with a magnetic attracting portion exposed to the fan housing. According to this construction, since the magnetic attracting portion is exposed, the possible loss of the magnetic body can be ascertained during the manufacture, the assemblage and the use by a user.

Where the retainer portion is provided in the debris covering, the retainer portion may have an insertion opening, through which the magnetic body is inserted, and a projecting body to keep the magnetic body from falling out of the insertion opening. The projecting body includes, for example, a plug fitted to the retainer portion and a step (projecting portion) provided in the holding wall. According to this construction, the magnetic body can be easily assembled into the retainer portion, and also, any possibility of losing the magnetic body can be avoided.

Where the retainer portion is provided in the debris covering, a finger holding portion, to which a finger of a worker is engaged, may be formed in a tip end of the retainer portion in the debris covering. According to this construction, since the retainer portion and the finger holding portion can be concurrently used, the structure can be simplified.

In the present invention, the debris covering may comprise a covering portion opposed to the cleaning access window and a guide wall engaged in the cleaning access window. According to this construction, the debris covering can be engaged in the cleaning access window along the guide wall and, therefore, the operability is good. Accordingly, the cleaning work can be facilitated.

Where the guide wall is provided in the debris covering, the magnetic body may be configured so that a magnetic attracting force acts in a condition with the guide wall engaged within the cleaning access window. According to this construction, it is possible to avoid an undesirable magnetic attraction of the debris covering to the fan housing. Therefore, the workability during the closure of the debris covering increases.

Where the guide wall is provided in the debris covering, an outer peripheral wall may be formed on an outer edge side of the guide wall in the debris covering. According to this construction, thanks to both of the guide wall and the outer peripheral wall, any leakage of a cooling wind from inside of the fan housing can be minimized. Hence, any lowering of the cooling performance can be suppressed.

In the present invention, the debris covering may be provided with a tether cord that is engaged with the fan housing. According to this construction, the debris covering is engaged to the fan housing via the tether cord, and therefore, even when the debris covering is opened, any loss of the debris covering can be prevented.

Where the tether cord is employed, the tether cord referred to may be in the form of a flexible string-like body that is formed integrally with the debris covering. According to this construction, since the tether cord is flexible, it is easy to avoid any possible interference between the tether cord and any other member. As a result thereof, any undesirable lowering of the durability of the tether cord can be suppressed.

Where the tether cord is employed, an insertion hole through which the tether cord is passed may be formed in the fan housing, and the tether cord may include a loss preventing piece to avoid a loss thereof from the insertion hole. According to this construction, with a simplified structure, any loss of the debris covering can be avoided.

In the present invention, the cleaning access window may be opposed to the cooling fin of each of cylinder units of a V-shaped two cylinders. According to this construction, removal of the dust entangled in the cooling fins can be accomplished easily. In such case, when viewed from an axial direction of the engine rotary shaft, an air cleaner may be disposed between the two cylinders. According to this construction, since the air cleaner is disposed within a space delimited between the two cylinders, the engine is rendered to be compact. Also, since corresponding maintenances of the air cleaner and the cooling fins can be accomplished at respective position close to each other, the maintenance can be increased.

In the present invention, one of the fan housing and the debris covering may be a ferromagnetic body and the other of them may be made of a resin material, in which case the magnetic body may be provided on the other side. According to this construction, the degree of freedom of selection of material for each of the fan housing and the debris covering increases.

It is to be noted that any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
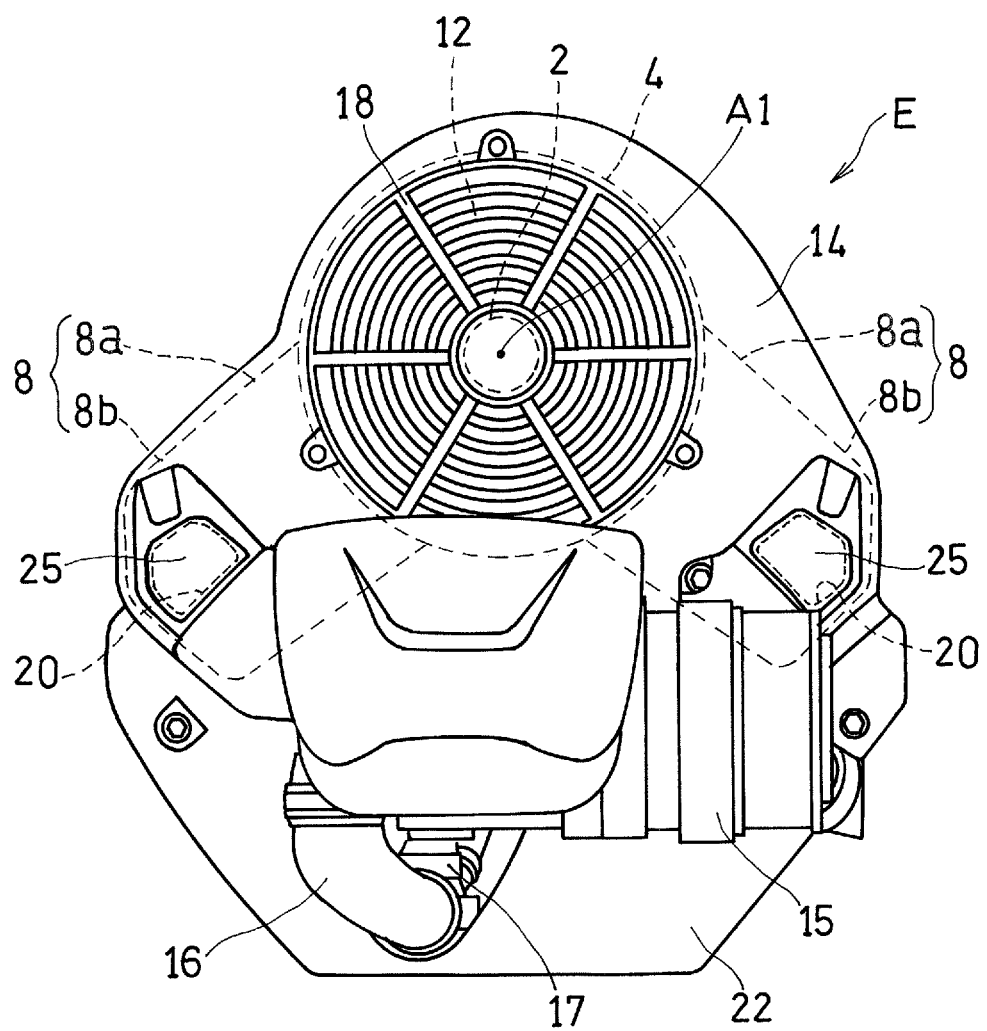
FIG. 1 is a top view showing a general purpose engine according to a first preferred embodiment of the present invention.
Figure 2:
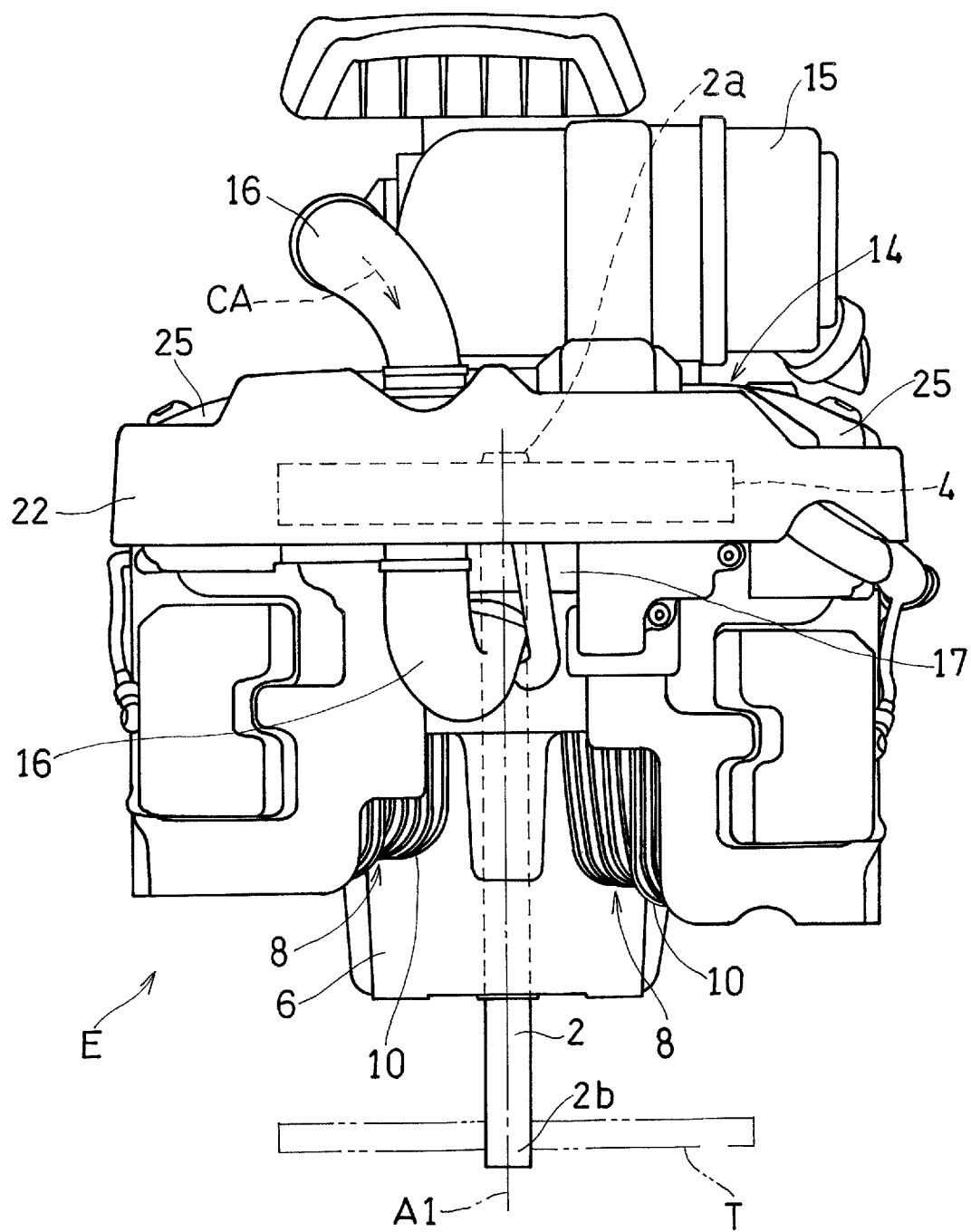
FIG. 2 is a front elevational view of the general purpose engine.

Hereinafter, a preferred embodiment of the present invention will be described in detail with reference to the accompanying drawings. FIG. 1 is a top view of a general purpose engine according to the first preferred embodiment of the present invention and FIG. 2 is a front elevational view thereof. The general purpose engine is applied to, for example, a lawn mower of a passenger type. The general purpose engine E according this preferred embodiment is an air cooled engine having a crankshaft 2, which is in the form of a kind of engine rotary shaft and which extends in a vertical direction, as shown in FIG. 2. In other words, a cooling fan 4 is fitted to an upper end portion 2$a$, which is an end of the crankshaft 2 on one side (i.e., which is a first end of the crankshaft 2), and a tool T (cutting blade, for example) is fixed to a lower end portion 2$b$ which is an end of the crankshaft 2 on the other side (i.e., which is a second end of the crankshaft 2 opposite to the first end of the crankshaft 2).

The general purpose engine E furthermore includes a crankcase 6 having the crankshaft 2 rotatably supported thereby, and a cylinder unit 8 extending from the crankcase 6 in a direction perpendicular to an axis A1 of the engine rotary shaft shown in FIG. 1. The cylinder unit 8 has a cylinder portion 8$a$ defining a combustion chamber and a cylinder head portion 8$b$, and valve members forming respective parts of intake and exhaust systems and an ignition plug and others are provided in the cylinder head portion 8$b$.

The general purpose engine E employed in the practice of the preferred embodiment is a V-type two cylinder engine. A cooling fin 10 shown in FIG. 2 is provided in each of the two cylinder units 8. The cooling fin 10 is a protruding structural body and is provided for increasing the heat exchange efficiency with the surface area increased. When viewing from a direction along the axis A1 of the crankshaft 2, an air cleaner 15 is disposed above the interval between two cylinders as shown in FIG. 1. The air cleaner 15 has an element (not shown) disposed therein and serves to filtrate the external air (air). A purified air so filtered is supplied to the cylinder unit 8 through an intake tube 16 and a fuel supply device 17.

In the fuel supply device 17, the amount of the purified air to be supplied to the cylinder unit 8 is regulated, and also, an air-fuel mixture is formed by mixing air with fuel. The fuel supply device 17 employed in the practice of the embodiment now under discussion is in the form of a throttle body equipped with a fuel injector. It is, however, to be noted that the fuel supply device 17 may not necessarily be limited to that described above and, instead, a carburetor, for example, may be employed therefor.

The engine E further includes a fan housing 14. This fan housing 14 has defined therein an air induction opening 12 for the cooling fan 4 as shown in FIG. 1, and covers the crankcase 6 and the cylinder unit 8, both shown in FIG. 2, from above. The fan housing 14 employed in the practice of the embodiment now under discussion is made of a metal sheet. Specifically, the fan housing 14 is made of a ferromagnetic material. The air induction opening 12 shown in FIG. 1 has a screen 18 mounted thereon. This screen 18 is removably fitted to the fan housing 14 and serves to prevent dust such as, for example, grasses from intruding into a rotating assembly including the crankshaft 2, the cooling fan 4, etc. on the axis A1.

Figure 3:
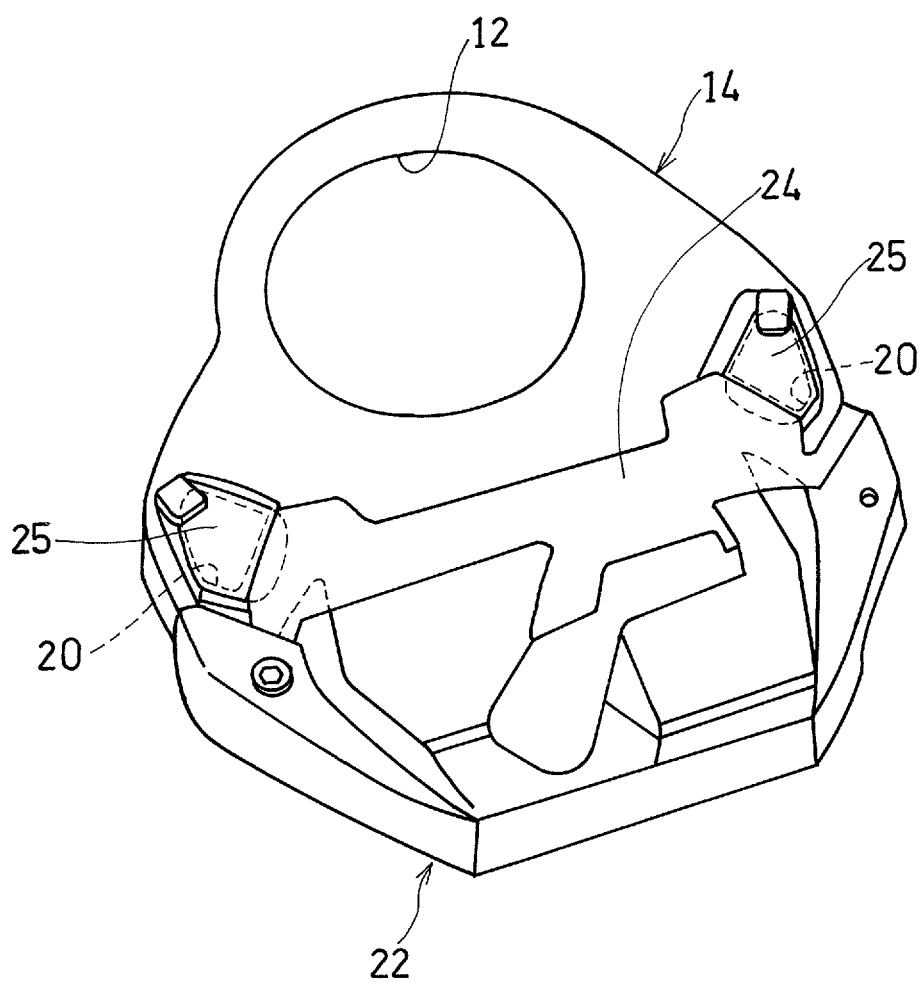
FIG. 3 is a perspective view showing a fan housing and front and rear coverings of the general purpose engine.

A front side (a lower side as viewed in FIG. 1) of the fan housing 14 is provided with a front covering 22. This front covering 22 encloses upper and outer peripheral regions of the fuel supply device 17. The front covering 22 employed in the practice of the embodiment now under discussion is made of a resin material, and is removably fixed to the engine E via a bracket (not shown) by means of a fastening member such as, for example, a bolt. It is noted that the front covering 22 may be fitted to the fan housing 14. As shown in FIG. 3, a rear covering 24 is employed between the fan housing 14 and the front covering 22. This rear covering 24 covers from above a gap delimited between the fan housing 14 and the front covering 22. The rear covering 24 employed in the practice of the embodiment now under discussion is made of a resin material and is removably fitted to the fan housing 14 by means of a fastening member such as, for example, a bolt.

A cleaning access window 20 is formed in an upper surface of the fan housing 14 shown in FIG. 1. This cleaning access window 20 is formed at a position of the fan housing 14, which position confronts the cooling fin 10 of the cylinder unit 8. In other words, in the practice of the embodiment now under discussion, the cleaning access window 20 is provided in two in number, which is equal to the number of the cylinder units 8. Through the cleaning access window 20, dust such as, for example, offscourings of turf that has been entangled in the cooling fin 10 are removed with the use of a sprayer such as, for example, an air gun.

Figure 5:
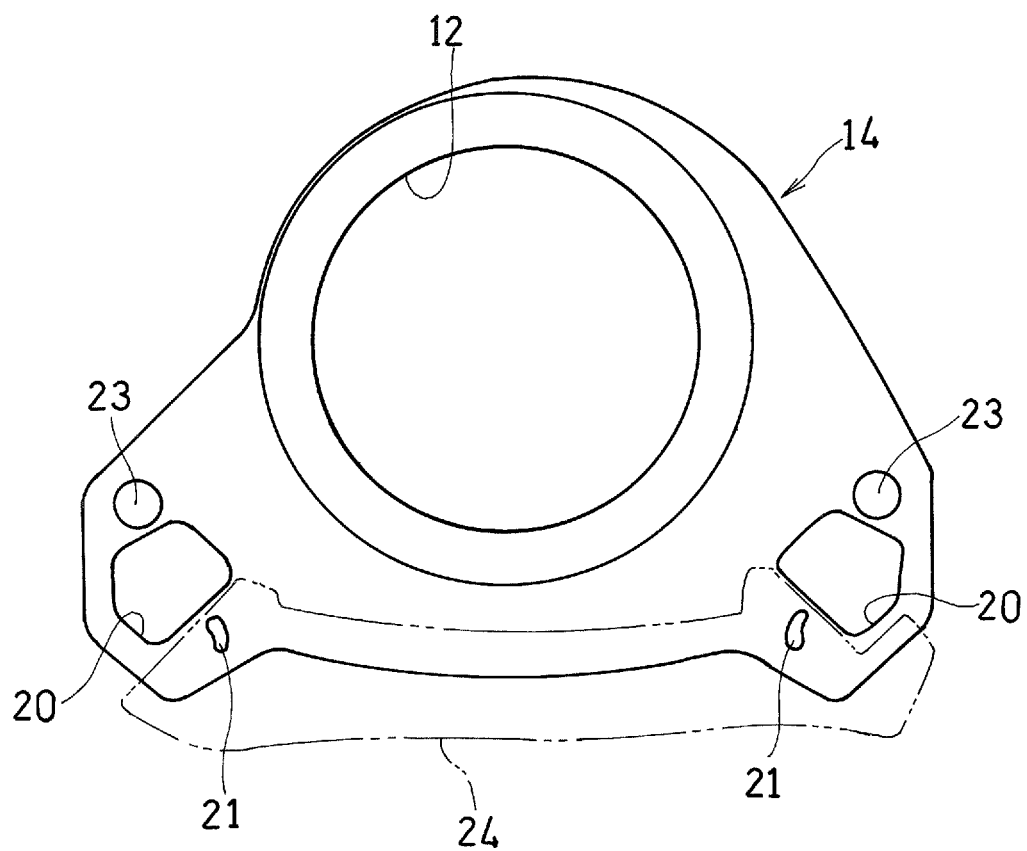
FIG. 5 is a top view showing the fan housing.

As shown in FIG. 5, an insertion hole 21 is formed in the vicinity of the cleaning access window 20 in the fan housing 14. The insertion hole 21 is formed in a number equal to the number of the cleaning access window 20, that is, two. This insertion hole 21 is formed on a front side inwardly of the cleaning access window 20, that is, on the side of the rear covering 24. The insertion hole 21 is covered from above by the rear covering 24 and is not exposed to the outside. The insertion hole 21 employed in the practice of the embodiment now under discussion is in the form of a slot. It is, however, to be noted that the shape of the insertion hole 21 may not be necessarily limited to that described above. A tether cord 55 (FIG. 6) as will be described in detail later is inserted into this insertion hole 21.

At the vicinity of the cleaning access window 20 in the fan housing 14, a projecting portion 23 that is raised upwardly is formed. Even the projecting portion 23 is formed in a number equal to the number of the cleaning access window 20. The projecting portion 23 is formed on a rear side outwardly of the cleaning access window 20, that is, on the side opposite to the rear covering 24. In other words, the projecting portion 23 is formed on the side opposite to the insertion hole 21 with the cleaning access window 20 intervened between the projecting portion 23 and the insertion hole 21. The projecting portion 23 employed in the embodiment now under discussion is in the form of a round protruding portion. It is, however, to be noted that the shape of the projecting portion 23 may not be necessarily limited to that described above. To this projecting portion 23, a magnetic attracting portion 30a (FIG. 6) of a magnetic body 30 as will be described later is magnetically attracted.

As shown in FIG. 1, the cleaning access window 20 is covered by a debris covering 25 of a type capable of being selectively opened and closed. The debris covering 25 employed in the practice of the embodiment now under discussion is made of a resin material such as, for example, polypropylene. It is, however, to be noted that the material for the debris covering 25 may not be necessarily limited to that described above.

Figure 4:
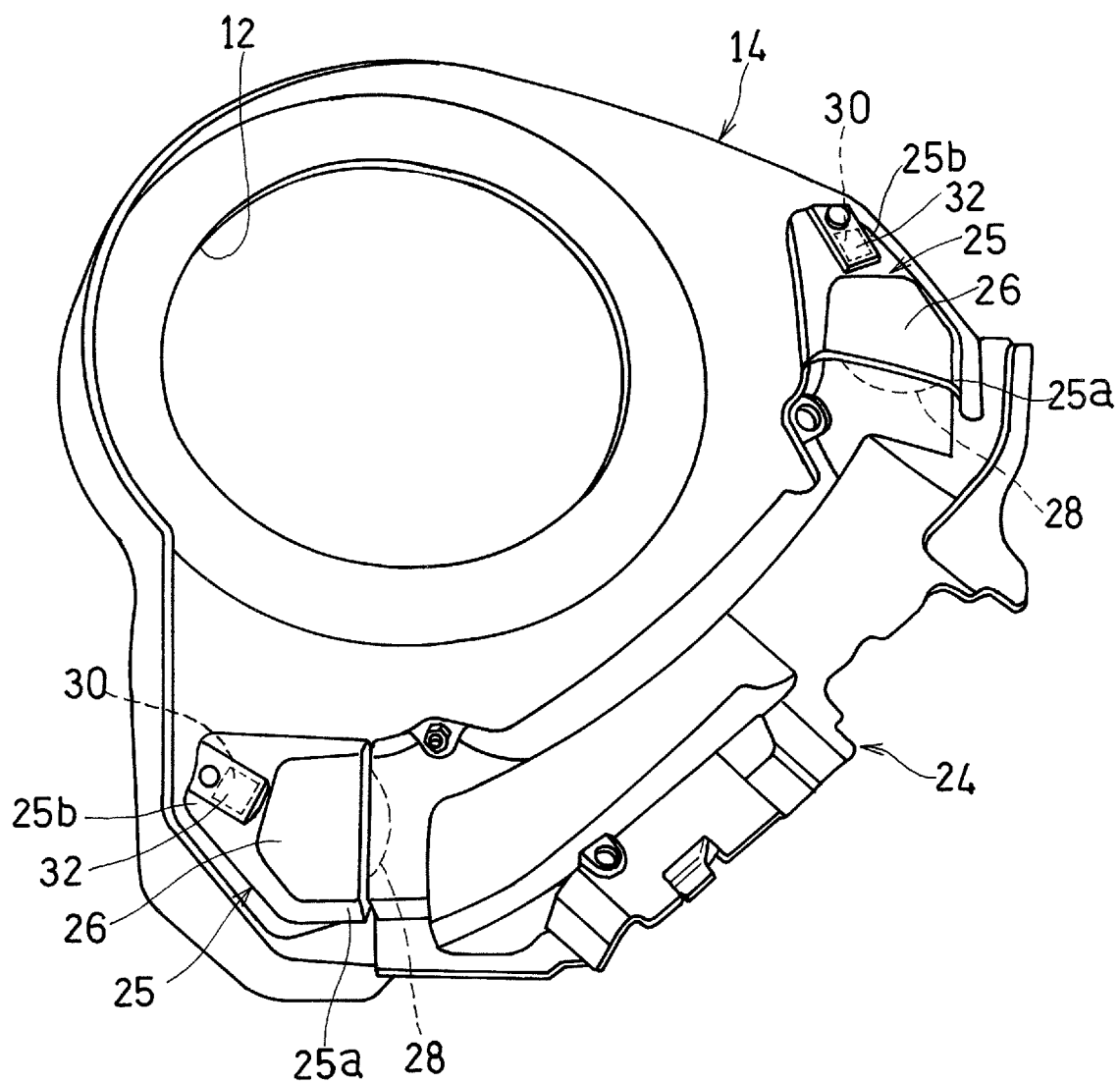
FIG. 4 is a perspective view showing a fan housing and the rear covering.

As shown in FIG. 4, the debris covering 25 has one end portion 25a engaged with the fan housing 14 and the other end portion 25b removably mounted on the fan housing 14 by means of the magnetic body 30. More specifically, the one end portion 25a of the debris covering 25 is inserted in a gap delimited between the fan housing 14 and the rear covering 24. In the practice of the embodiment now under discussion, the magnetic body 30 is provided in the debris covering 25, but the magnetic body 30 may be provided in the fan housing 14. In such case, the fan housing 14 has to be a non-magnetic body (for example, made of a resin material) whereas the debris covering 25 has to be a ferromagnetic body (for example, made of a metal sheet).

Figure 8:
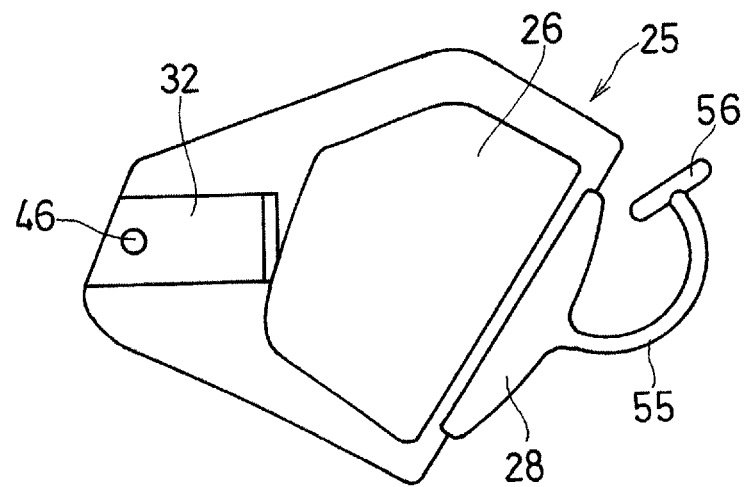
FIG. 8 is a top view showing the debris covering.

Specifically, the debris covering 25 includes: a covering portion 26 opposed to the cleaning access window 20; a to-be-engaged portion 28 engaged to the fan housing 14; and a retainer portion 32 for holding the magnetic body 30. In the practice of the embodiment now under discussion, the covering portion 26, the to-be-engaged portion 28 and the retainer portion 32 are integrally formed by means of die forming. As shown in FIG. 8, the to-be-engaged portion 28 and the retainer portion 32 are disposed on respective opposite sides with the covering portion 26 intervening between the to-be-engaged portion 28 and the retainer portion 32. The to-be-engaged portion 28 is constituted by an engagement piece smoothly swelling from the covering portion 26.

Figure 6:
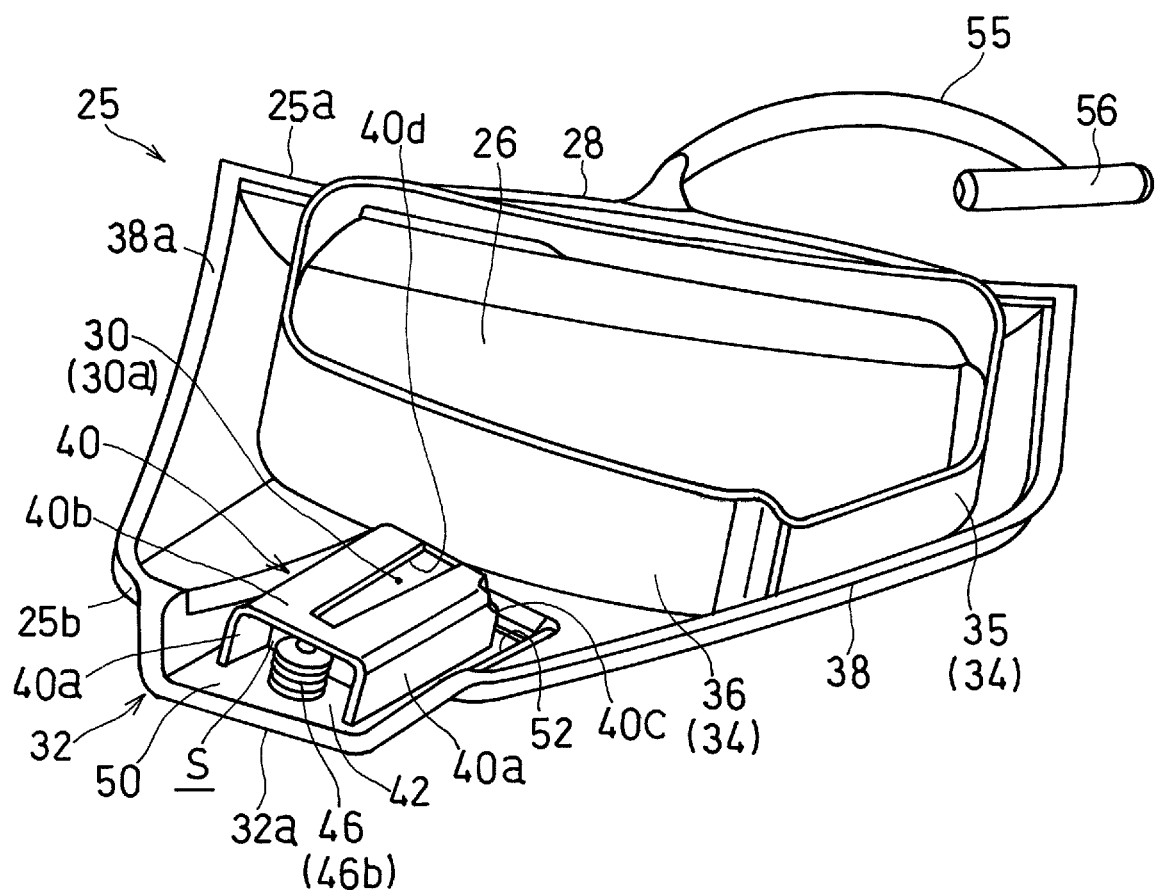
FIG. 6 is a perspective view showing the debris covering of the general purpose engine as viewed from a back surface (inner side) of the debris covering.

FIG. 6 is a perspective view showing the debris covering 25 as viewed from inside thereof. As shown in FIG. 6, the debris covering 25 also includes a guide wall 34. The guide wall 34 protruded inwardly from an inner surface of the debris covering 25. This guide wall 34 is so formed as to be inserted within the cleaner access window 20 (FIG. 5). In other words, the guide wall 34 is formed in an outer edge portion of the covering portion 26. In the practice of the embodiment now under discussion, the guide wall 34 is formed to represent a continuous periphery wall and assumes, when viewed from top, the same shape as that of the cleaner access window 20.

The guide wall 34 includes a first guide wall 35 having a small amount of projection and a second guide wall 36 having a large amount of projection. In other words, the second guide wall 36 is a wall higher than the first guide wall 35. The first guide wall 35 forms a portion on the side of the to-be-engaged portion 28 in the guide wall 34, and the second guide wall 36 forms a portion on the side of the retainer portion 32 in the guide wall 34. In the practice of the embodiment now under discussion, the first guide wall 34 and the second guide wall 36 are continuously connected. It is, however, to be noted that the first guide wall 35 and the second guide wall 36 may not be so formed continuously with each other and may be separate from each other. The guide wall 34 employed in the practice of the embodiment now under discussion is formed integrally with the covering portion 26 by the use of a die molding technique.

On an outer edge side of the debris covering 25 remote from the guide wall 34, an outer peripheral wall 38 is formed. In the embodiment now under discussion, the outer peripheral wall 38 is formed in an outer peripheral edge of the debris covering 25. The outer peripheral wall 38 protrudes inwardly (downwardly) from an inner surface (back surface) of the debris covering 25. The amount of protrusion of the outer peripheral wall 38 is smaller than the first guide wall 35. A tip end surface 38a of the outer peripheral wall 38 is in contact with an outer surface of the fan housing 14 when and so long as the debris covering 25 is fitted to the fan housing 14.

The outer peripheral wall 38 is continuously formed from the to-be-engaged portion 28 to the retainer portion 32. It is, however, to be noted that in the practice of the embodiment now under discussion the outer peripheral wall 38 is not formed in a tip end portion distant from the covering portion 26 of the retainer portion 32. The outer peripheral wall 38 employed in the practice of the embodiment now under discussion is formed integrally by the use of a die molding technique. It is to be noted that the outer wall 38 may be dispensed with.

The retainer portion 32 includes a holding wall 40 for holding the magnetic body 30. The holding wall 40 includes a pair of longitudinal walls 40a and 40a, which extend downwardly from an inner surface of the debris covering 25, and a bottom wall 40b connecting those longitudinal walls 40a and 40a together. The pair of the longitudinal walls 40a and 40a and the bottom wall 40b cooperate together to form a cross-sectional shape representing a U-shaped configuration. The holding walls 40 of the U-shaped configuration and the inner surface of the debris covering 25 cooperate to define a storage space S for accommodating therein the magnet body 30.

On the side of the holding wall 40 opposite to a tip end portion 32a of the retainer portion 32, a rear wall 40c is provided. The rear wall 40c is connected with the longitudinal walls 40a and 40a so as to extend from the inner surface (back surface) of the debris covering 25, terminating in contact with the bottom wall 40b. In other words, the longitudinal walls 40a and 40a, the bottom wall 40b, the rear wall 40c of the holding wall 40 and the inner surface of the debris covering 25 cooperate with each other to define the storage space S for storing the magnetic body 30, which space S opens on the side of the tip end portion 32a of the retainer portion 32. The opening on the side of the tip end portion 32a of the retainer portion 32 forms an insertion opening 42 for the magnetic body 30. In other words, the insertion opening 42 for the magnetic body 30 is formed in the holding wall 40 of the retainer portion 32, and through this insertion opening 42 the magnetic body 30 is inserted into the holding wall 40.

The holding wall 40 has a slit 40d defined in the bottom wall 40b thereof. The slit 40 is so as to extend completely through the bottom wall 40b. The slit 40d employed in the practice of the embodiment now under discussion is in the form of a groove so formed as to extend in a direction parallel to the longitudinal direction of the rectangular shaped bottom wall 40b. It is, however, to be noted that the shape of the slit 40d may not be necessarily limited to that described above. A portion of the magnetic body 30 is exposed outwardly from the slit 40d. Such a portion of the magnetic body 30 exposed outwardly from the slit 40d constitutes a magnetic attracting portion 30a that magnetically attracts the fan housing 14. In other words, the holding wall 40 holds the magnetic body 30 in a condition with the magnetic attracting portion 30a exposed outwardly from the slit 40d.

Figure 7:
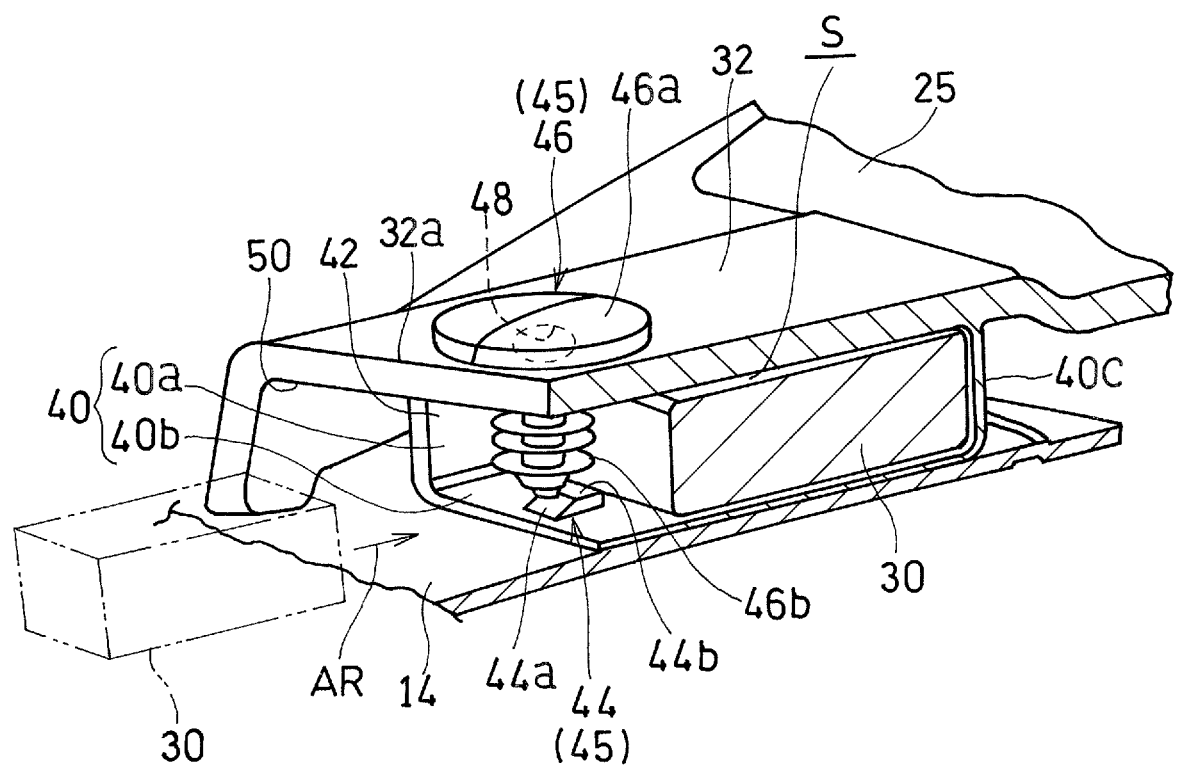
FIG. 7 is a longitudinal sectional view showing a retainer portion of the debris covering on an enlarged scale.

As shown in FIG. 7, a step 44 that protrudes towards the storage space S is provided in the bottom wall 40b of the holding wall 40. This step 44 is provided at the vicinity of the insertion opening 42 in the bottom wall 40b. This step 44 has defined therein an inclined surface 44a, which extends upwardly of the bottom wall 40b and is inclined relative to the bottom wall 40b in a direction towards the storage space S, and a flat surface 44b extending from the inclined surface 44a in parallel to the bottom wall 40b.

A plug 46 is fitted to the retainer portion 32. Specifically, the retainer portion 32 of the debris covering 25 has a plug insertion hole 48 defined therein, and the plug 46, which is made of a soft resinous material, is inserted from above into the plug insertion hole 48. The plug 46 has defined therein a head portion 46a and a shank portion 46b, the shank portion 46b having a plurality of umbrella-shaped collars. It is, however, to be noted that the structure of the plug 46 may not be necessarily limited to that described above. In a condition with the plug 46 inserted into the plug insertion hole 48, the head portion 46a is exposed on a surface of the debris covering 25, while the shank portion 46b extends through the storage space S in the vertical direction. The shank portion 46b has a tip end held in contact with or in proximate to an end surface of the step 44.

The step 44 and the plug 46 cooperate with each other to define a projecting body 45 that protrudes through the storage space S. The projecting body 45 serves to prevent the magnetic body 30 from falling out via the insertion opening 42. Although the projecting body 45 employed in the practice of the embodiment now under discussion is comprised of the plug 46, fitted to the retainer portion 32, and the step 44 provided in the holding wall 40, it may be comprised of only one of the plug 46 and the step 44. Also, the structure of the projecting body 45 may not be necessarily limited to that described above.

A finger holding portion 50 is formed at the tip end portion 32a of the retainer portion 32 in the debris covering 25. When the debris covering 25 is to be opened by a worker, a finger of the worker is engaged to the finger holding portion 50. As shown in FIG. 6, as viewed from the back surface of the debris covering 25, a recessed portion 52 recessed in a direction upwardly of the debris covering 25 is formed, and a tip end of this recessed portion 52 constitutes the finger holding portion 50.

The holding wall 40 shown in FIG. 7 is formed within the recessed portion 52. In other words, the magnetic body 30 is positioned within the recessed portion 52, and the insertion opening 42 for the magnetic body 30 is in position to open towards the finger holding portion 50. In this way, in the practice of the embodiment now under discussion, a space, to which the worker's finger is engaged, and a space, into which the magnetic body 30 is inserted, are commonalized with each other.

In the description that follows, inserting and holding procedures to insert and hold the magnetic body 30 into the retainer portion 32 will be discussed. The magnetic body 30, shown by the doubled dotted line in FIG. 7, is inserted through the insertion opening 42 into the storage space S in the holding wall 40 as shown by the arrow headed line AR. At this time, the magnetic body 30 is guided by the inclined surface 44a and the flat surface 44b of the step 44 and is then inserted into the storage space S while the holding wall 40 is elastically deformed downwardly. Within the storage space S, the magnetic body 30 is retained in between the rear wall 40c and the step 44.

In this condition, the plug 46 is inserted from above into the plug insertion hole 48 in the retainer portion 32. By so doing, the magnetic body 30 is held in position not to drop out from the storage space S in the holding wall 40. Although in the practice of the embodiment now under discussion the plug 46 is so configured as to be incapable of being removed, it may be so configured as to be capable of being removed.

In the embodiment now under discussion, a neodymium magnet is selected for the magnetic body 30. The neodymium magnet has a rather stronger magnetic force among various magnets now being put into practical use and is available at a lower price than those of any other rare-earth magnets. In the practice of the embodiment now under discussion, the magnetic body 30 is plated, for example, with nickel, for rust prevention purpose. This metal plating may be dispensed with. Also, the magnetic body 30 may not be necessarily limited to neodymium magnet and, instead, any other permanent magnet may be employed.

As described above, when the magnetic body having a suitable magnetic force is selected, the opening of the debris covering 25 during execution of the work can be avoided while the debris covering 25 is easily removable relative to the fan housing 14. Also, selection of the neodymium magnet having a strong magnetic field for a given size makes it possible to increase the freedom of design. Specifically, since the magnetic body 30 can be reduced in size, the height of the storage space S in the holding wall 40 can be minimized. Accordingly, since reduction in size of the holding wall 40 can be achieved, the appearance can be increased and the cost of manufacture can be reduced.

As shown in FIG. 8, the debris covering 25 is provided with a tether cord 55. Specifically, the tether cord 55 is provided in the to-be-engaged portion 28 in the debris covering 25. In the practice of the embodiment now under discussion, the tether cord 55 is in the form of a flexible string-like element and is integrally formed with the debris covering 25 by the use of a die molding technique. The tether cord 55 has a tip end provided with a loss preventing piece 56. The loss preventing piece 56 employed in the practice of the embodiment now under discussion is in the form of a bar member of a cylindrical shape that extends in a direction perpendicular to the string-like element.

Figure 9:
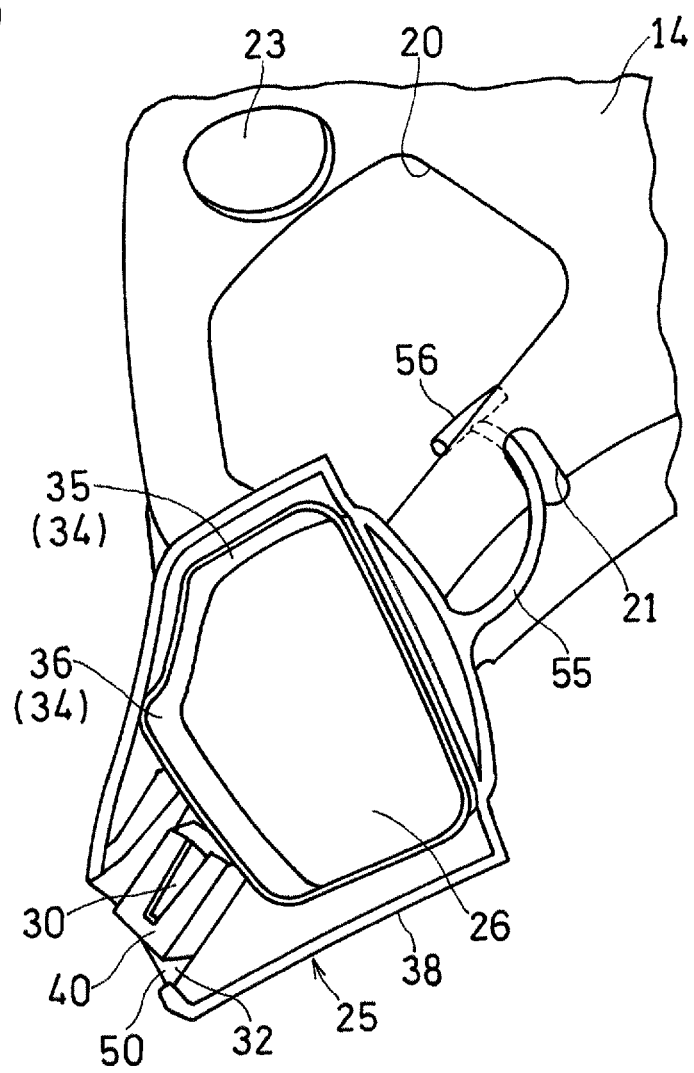
FIG. 9 is a perspective view showing a cleaning access window with the debris covering opened.

As shown in FIG. 9, the tether cord 55 is engaged with the fan housing 14 to prevent the debris covering 25 from dropping out from the fan housing 14. Specifically, the tether cord 55 is passed through the insertion hole 21 in the fan housing 14 in a direction inwardly of the fan housing 14 to allow the loss preventing piece 56 to retain the tether cord 55 in position not to be detached from the insertion hole 21.

The tether cord 55 is in the form of the flexible string-like element and is formed as curved. Accordingly, as compared with that formed in a linear fashion, it is easy to avoid the tether cord 55 from interfering with any other component part and/or walls or the like of the fan housing 14. As a result thereof, the durability of the tether cord 55 can be prevented from degrading. Also, in a condition with the debris covering 25 opened, the fan housing 14 and the debris covering 25 remain connected with each other through the only flexible tether cord 55. Accordingly, the direction of opening of the debris covering 25 is not limited. For example, in the case that the debris covering 25 is fitted to the fan housing 14 with the use of a bolt, the need is realized to turn the debris covering 25 about the axis of the bolt or the debris covering 25 has to be completely removed from the fan housing 14 by means of the bolt.

Also, where the tether cord 55 is formed in the linear fashion, the tether cord 55 is apt to interfere with the wall inside the fan housing 14. As a result thereof, a force acts in a direction tending to open the debris covering 25 from the fan housing 14, and thus, the spacing between the cleaning access window 20 and the debris covering 25 is apt to be large. In such case, concern will arise that a cooling wind will leak from inside of the fan housing 14. In the practice of the embodiment now under discussion, since the tether cord 55 is curved, the interference between the tether cord 55 and the fan housing 14 is suppressed, and therefore, the gap between the cleaning access window 20 and the debris covering 25 can be minimized. As shown in FIG. 5, since the tether cord 55 and the insertion hole 21 are covered from above with the rear covering 24, exposure of the insertion hole 21 to the outside is avoided, and also, the loss preventing piece 56 is hardly separated. As a result, the tether cord 55 can be made further robust against separation from the fan housing 14.

Figure 10:
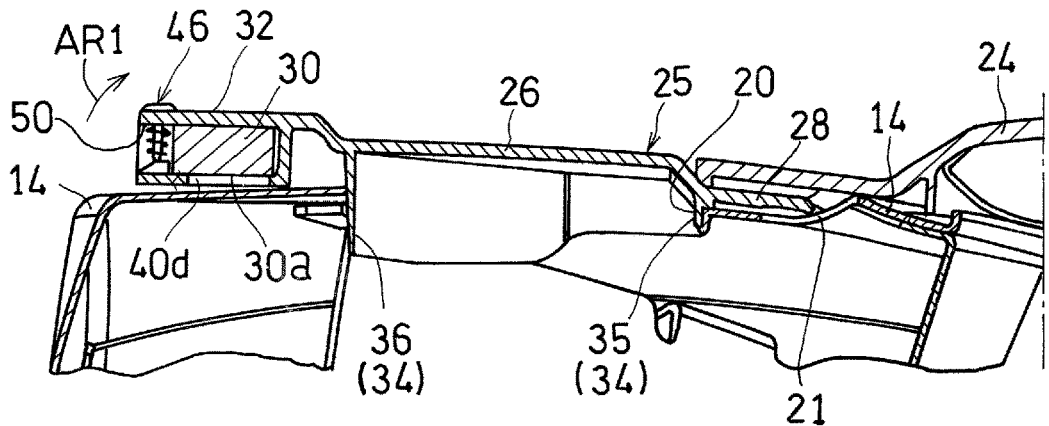
FIG. 10 is a longitudinal view showing a condition in which the debris covering is closed.
Figure 11:
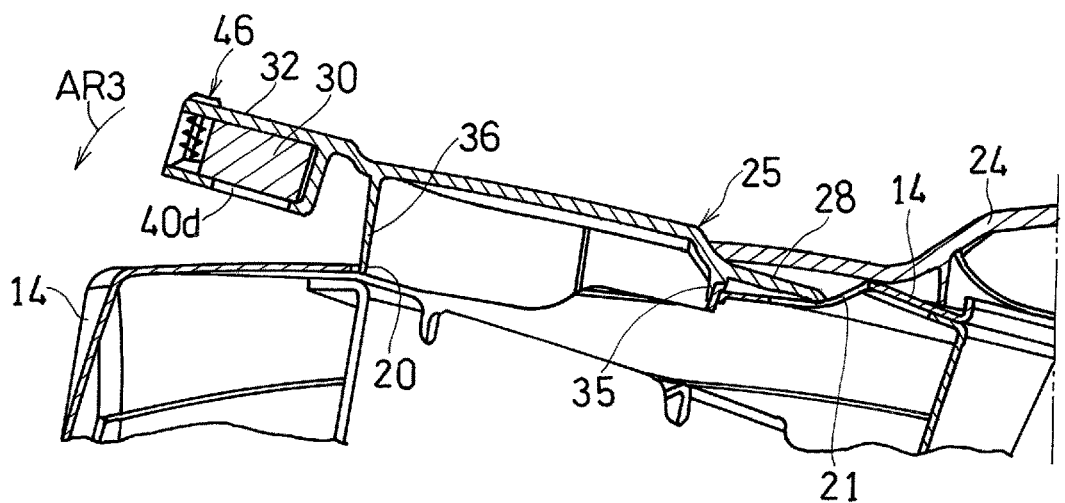
FIG. 11 is a longitudinal sectional view showing a second guide wall of the debris covering being engaged in the cleaning access window.
Figure 12:
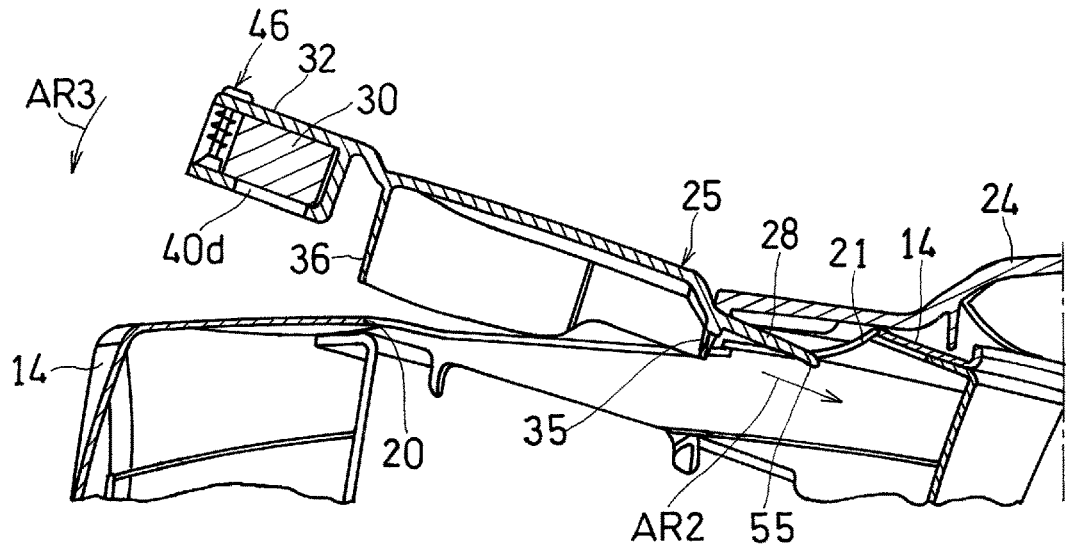
FIG. 12 is a longitudinal sectional view showing the debris covering held at a position of the intermediate opening.

In the following description, procedures to remove and fit the debris covering 25 will be described with particular reference to FIGS. 10 to 12. In particular, FIG. 10 illustrates the debris covering 25 held in a closed condition; FIG. 11 illustrates the debris covering 25 in a condition somewhat opened from the condition shown in FIG. 10; and FIG. 12 illustrates the debris covering 25 in a condition further opened from the condition shown in FIG. 11.

When foreign matters such as, for example, turf grasses and/or dust or the like, which are entangled in the cylinder unit 8, is to be removed, the debris covering 25 shown in FIG. 10 is opened to expose the cleaning access window 20 to the outside. In other words, the worker's finger is engaged in the finger holding portion 50 at the tip end of the debris covering 25, followed by lifting the debris covering 25 in the direction, shown by the arrow headed line AR1, against the magnetic force of the magnetic body 30. By so doing, the debris covering 25 can be opened from the fan housing 14 with the cleaning access window 20 exposed to the outside consequently.

The dust such as, for example, chips or the like of the lawn grasses, which are entangled in the cooling fins 10 are removed through the cleaning access window 20 with the use of a sprayer such as, for example, an air gun. At this time, as shown in FIG. 9, the tether cord 55 is passed into the insertion hole 21 in the fan housing 14 and, by the action of the loss preventing piece 56, loss of the debris covering 25 from the fan housing 14 is prevented.

After the cleaning, the debris covering 25 is fitted to the fan housing 14, and the cleaning access window 20 is thereby closed. At the outset, as shown in FIG. 12, the debris covering 25 is moved in a direction indicated by the arrow headed line AR2 to allow the to-be-engaged portion 28 of the debris covering 25 to be inserted in the gap between the fan housing 14 and the rear covering 24. As a result, the to-be-engaged portion 28 is engaged with the rear covering 24 and the fan housing 14. Under this condition, when the tip end of the debris covering 25 is pressed downwardly in a direction shown by the arrow headed line AR3, the first guide wall 35 of the debris covering 25 is engaged into the cleaning access window 20. In the embodiment now under discussion, the magnetic force of the magnetic body 30 is so adjusted that a force of attraction may act with the first guide wall 35 received in the cleaner access window 20.

When the tip end of the debris covering 25 is further depressed downwardly in the direction indicated by the arrow headed line AR3, the second guide wall 36 of the debris covering 25 comes to be located within the cleaner access window 20 as shown in FIG. 11. The debris covering 25 is furthermore rotated in a direction of the arrow headed line AR3 having been guided by the second guide wall 36, and the magnetic attracting portion 30a of the magnetic body 30 magnetically attracts the projecting portion 23 of the fan housing 14. In this way, the cleaning access window 20 is held in a closed condition as shown in FIG. 10.

According to the construction hereinabove described, since the debris covering 25 shown in FIG. 10 is removably mounted on the fan housing 14 by means of the magnetic body 30, the debris covering 25 can be opened with no tool used. Accordingly, access to the cleaning access window 20 is made easy, and the convenience of maintenance increases. Also, one end portion of the debris covering 25 is engaged with the fan housing 14 and the rear covering 24, and the other end portion is mounted on the fan housing 14 by the magnet body 30. Accordingly, only one magnetic body 30 is sufficient, and also, the cleaning access window 20 can be exposed by manipulating the debris covering 25 with one hand. Thereby, the convenience of maintenance further increases.

The debris covering 25 includes: the covering portion 26 opposed to the cleaning access window 20 shown in FIG. 9; the to-be-engaged portion 28 that is engaged with the fan housing 14; and the retainer portion 32 for holding the magnetic body 30. Accordingly, the magnetic body 30 can be provided integrally with the debris covering 25. As a result, the structure for fitting the debris covering 25 to the fan housing 14 can be simplified.

As shown in FIG. 6, the retainer portion 32 has the holding wall 40 for holding the magnetic body 30 in a condition while the magnetic attracting portion 30a for magnetically attracting the fan housing 14 is exposed to the outside. Since the magnetic attracting portion 30a is exposed in this way, it is possible, during the manufacture and assemblage and also during the use by the user, to ascertain with the naked eyes whether or not the magnetic body 30 is missing.

As shown in FIG. 7, the retainer portion 32 includes the insertion opening 42, through which the magnetic body 30 is inserted, and the plug 46 for preventing the magnetic body 30 from dropping out from the insertion opening 42. Accordingly, the magnetic body 30 can be easily assembled into the retainer portion 32, and also, it is possible to avoid any possibility of losing the magnetic body 30.

The finger holding portion 50, to which the worker's finger can be engaged, is formed at the tip end of the retainer portion 32 in the debris covering 25. Accordingly, the retainer portion 32 and the finger holding portion 50 can be concurrently used and, therefore, the structure is simplified.

The debris covering 25 also includes the first and second guide walls 35 and 36 that can be engaged in the cleaning access window 20 shown in FIG. 12. Accordingly, the debris covering 25 can be engaged into the cleaning access window 20 along the first and second guide walls 35 and 36, and therefore, the operability is good. As a result, the cleaning work can be facilitated.

The magnetic body 30 is so set that the magnetic attracting force acts in a condition with the first guide wall 35 or the second guide wall 36 engaged in the cleaning access window 20. In other words, the magnetic attracting force of the magnetic body 30 is so set that the magnetic body 30 is not attracted in an unrequired direction prior to engagement of the first guide wall 35 or the second guide wall 36 with the cleaning access window 20. Accordingly, it is possible to avoid the possibility that the debris covering 25 may be undesirably attracted to the fan housing 14. As a result, the workability during the closure of the debris covering 25 increases.

The outer peripheral wall 38 is formed on the outer edge side of the first and second guide walls 35 and 36 in the debris covering 25. Thanks to the first and second guide walls 35, 36 and the outer peripheral wall 38, all shown in FIG. 6, any possible leakage of the cooling wind from the inside of the fan housing 14 can be minimized. As a result thereof, the cooling performance is maintained.

As shown in FIG. 9, the debris covering 25 is provided with the tether cord 55 that is engageable with the fan housing 14. Since the debris covering 25 is engaged to the fan housing 14 via the tether cord 55, the loss of the debris covering 25, which may occur when the debris covering 25 is opened, can be avoided.

Since the tether cord 55 is in the flexible string-like form that is integrally formed with the debris covering 25, it is easy to avoid any possible interference between the tether cord 55 and any other member. As a result thereof, any possible reduction in durability of the tether cord 55 can be suppressed.

The fan housing 14 is formed with the insertion hole 21, through which the tether cord 55 is passed, and the tether cord 55 includes the loss preventing piece 56 to avoid any possible loss from the insertion hole 21. Accordingly, with a simplified structure, the loss of the debris covering 25 can be avoided.

The cleaning access window 20 is opposed to the cooling fins 10 of the cylinder units 8 of the V-shaped two cylinders shown in FIG. 1. Accordingly, removal of the dust entangled in the cooling fins 10 is easy to remove. Also, as viewed form the direction along the axis A1 of the engine rotary shaft, the air cleaner 15 is disposed between the two cylinders (cylinder unit) 8 and 8. Accordingly, since the air cleaner 15 is disposed in a space delimited between the cylinders 8 and 8, the engine E is rendered to be compact. Also, since the maintenance of both of the air cleaner 15 and the cooling fins 10 is enabled at a close position, the maintenance is increased.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing the embodiment hereinabove described, the fan housing 14 has been formed of the ferromagnetic material and the magnetic body 30 has been shown and described as provided in the debris covering made of the resin material (non-magnetic material), the magnetic body may be provided in the fan housing 14 while the debris covering 25 is made of a ferromagnetic material and the fan housing 14 is then made of a resin material (non-magnetic material).

Accordingly, such changes and modifications are, unless they depart from the scope of the present invention as delivered from the claims annexed hereto, to be construed as included therein.

REFERENCE NUMERALS

2 . . . Crankshaft (Engine rotary shaft)
4 . . . Cooling fan
6 . . . Crankcase
8 . . . Cylinder unit
10 . . . Cooling fin
12 . . . Air induction opening
14 . . . Fan housing 15 . . . Air cleaner
20 . . . Cleaning access window
21 . . . Insertion hole
25 . . . Debris covering
26 . . . Covering portion
28 . . . To-be-engaged portion
30 . . . Magnetic body
30a . . . Magnetic attracting portion
32 . . . Retainer portion
34 . . . Guide wall
38 . . . Outer peripheral wall
40 . . . Holding wall
42 . . . Insertion opening
45 . . . Projecting body
50 . . . Finger holding portion
55 . . . Tether cord
56 . . . Loss preventing piece
E . . . Engine
A1 . . . Axis of the engine rotary shaft

What is claimed is:

1. A general purpose engine which comprises:
a crankcase configured to support an engine rotary shaft rotatably;
a cylinder unit extending from the crankcase in a direction perpendicular to an axis of the engine rotary shaft;
a cooling fan fixed to one of opposite ends of the engine rotary shaft on one side thereof; and
a fan housing configured to have an air induction opening defined therein for the cooling fan and also to cover the crankcase and the cylinder unit from one side of the engine rotary shaft, wherein
a cleaning access window is defined at a position of the fan housing, which position is opposed to a cooling fin of the cylinder unit,
the cleaning access window is covered by a debris covering capable of being selectively opened and closed,
the debris covering has one end portion engaged with the fan housing and also has an other end portion removably mounted on the fan housing by means of a magnetic body,
the debris covering comprises:
  a covering portion opposed to the cleaning access window;
  a to-be-engaged portion engaged to the fan housing; and
  a retainer portion configured to retain the magnetic body,
the retainer portion comprises a holding wall configured to hold the magnetic body in a condition with a magnetic attracting portion exposed to the fan housing,
the holding wall includes: a pair of longitudinal walls, which extend downwardly from an inner surface of the debris covering; and a bottom wall connecting the pair of longitudinal walls together,
the pair of the longitudinal walls and the bottom wall cooperate together to form a cross-sectional shape representing a U-shaped configuration, and the holding walls of the U-shaped configuration and the inner surface of the debris covering cooperate to define a storage space for accommodating therein the magnetic body,
the holding wall has a slit defined in the bottom wall thereof, the slit being so as to extend completely through the bottom wall, and
a portion of the magnetic body is exposed outwardly from the slit, the portion of the magnetic body being a part of the magnetic attracting portion.

2. A general purpose engine which comprises:
a crankcase configured to support an engine rotary shaft rotatably;
a cylinder unit extending from the crankcase in a direction perpendicular to an axis of the engine rotary shaft;
a cooling fan fixed to one of opposite ends of the engine rotary shaft on one side thereof; and
a fan housing configured to have an air induction opening defined therein for the cooling fan and also to cover the crankcase and the cylinder unit from one side of the engine rotary shaft, wherein
a cleaning access window is defined at a position of the fan housing, which position is opposed to a cooling fan of the cylinder unit,
the cleaning access window is covered by a debris covering capable of being selectively opened and closed,
the debris covering has one end portion engaged with the fan housing and also has an other end portion removably mounted on the fan housing by means of a magnetic body,
the debris covering comprises:
  a covering portion opposed to the cleaning access window;
  a to-be-engaged portion engaged to the fan housing; and
  a retainer portion configured to retain the magnetic body,
the retainer portion is configured to have an insertion opening, through which the magnetic body is inserted, and a projecting body to avoid a loss of the magnetic body from the insertion opening,
the projecting body has: an inclined surface defined therein, which extends upwardly from a bottom wall of the retainer portion and is inclined relative to the bottom wall in a direction towards a storage space for accommodating the magnetic body; and a flat surface extending from the inclined surface in parallel to the bottom wall.

3. The general purpose engine as claimed in claim 1, wherein a finger holding portion, to which a finger of a worker is engaged, is formed in a tip end of the retainer portion in the debris covering.

4. The general purpose engine as claimed in claim 1, wherein the debris covering comprises a covering portion opposed to the cleaning access window and a guide wall engaged in the cleaning access window.

5. The general purpose engine as claimed in claim 4, wherein the magnetic body is configured so that a magnetic attracting force acts in a condition with the guide wall engaged within the cleaning access window.

6. The general purpose engine as claimed in claim 4, wherein an outer peripheral wall is formed on an outer edge side of the guide wall in the debris covering.

7. The general purpose engine as claimed in claim 1, wherein the debris covering is provided with a tether cord that is engaged with the fan housing.

8. The general purpose engine as claimed in claim 7, wherein the tether cord is a flexible string-like element formed integrally with the debris covering.

9. The general purpose engine as claimed in claim 7, wherein an insertion hole, through which the tether cord is passed, is formed in the fan housing, and
the tether cord includes a loss preventing piece to avoid a loss thereof from the insertion hole.

10. The general purpose engine as claimed in claim 1, wherein the cleaning access window is opposed to the cooling fin of each of cylinder units of a V-shaped two cylinders.

11. The general purpose engine as claimed in claim 10, wherein, when viewed from an axial direction of the engine rotary shaft, an air cleaner is disposed between the two cylinders.

12. The general purpose engine as claimed in claim 1, wherein one of the fan housing or the debris covering is a ferromagnetic body whereas an other of the fan housing or the debris covering is made of a resin material, the magnetic body being provided on the other of the fan housing or the debris covering.

\* \* \* \* \*